March 10, 1936.  J. G. SMITH  2,033,655
METHOD OF AND APPARATUS FOR MAKING BALL TASSELS
Filed Sept. 29, 1934  7 Sheets-Sheet 1

INVENTOR.
JOSEPH G. SMITH
BY
ATTORNEY.

March 10, 1936. J. G. SMITH 2,033,655
METHOD OF AND APPARATUS FOR MAKING BALL TASSELS
Filed Sept. 29, 1934 7 Sheets-Sheet 3

INVENTOR.
JOSEPH G. SMITH
BY
J. Granville Meyers
ATTORNEY.

March 10, 1936. J. G. SMITH 2,033,655
METHOD OF AND APPARATUS FOR MAKING BALL TASSELS
Filed Sept. 29, 1934 7 Sheets-Sheet 4

INVENTOR.
JOSEPH G. SMITH
BY
ATTORNEY.

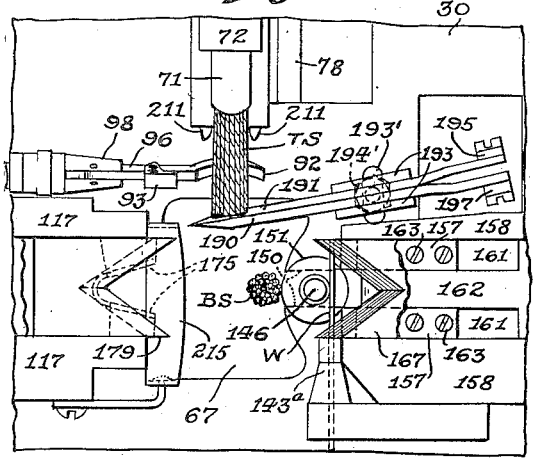
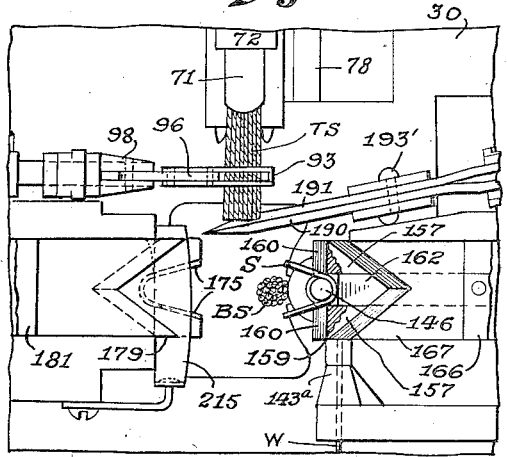
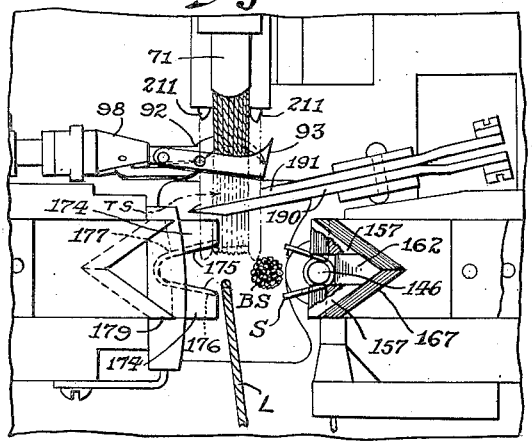
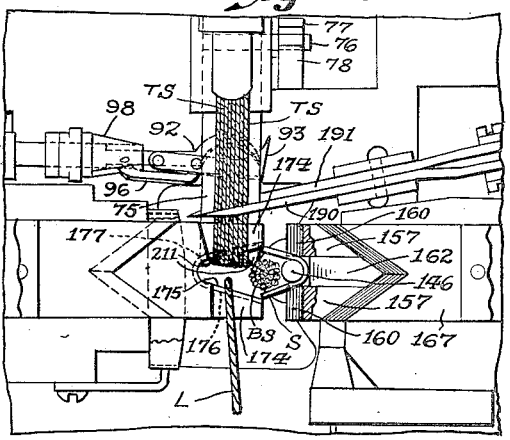
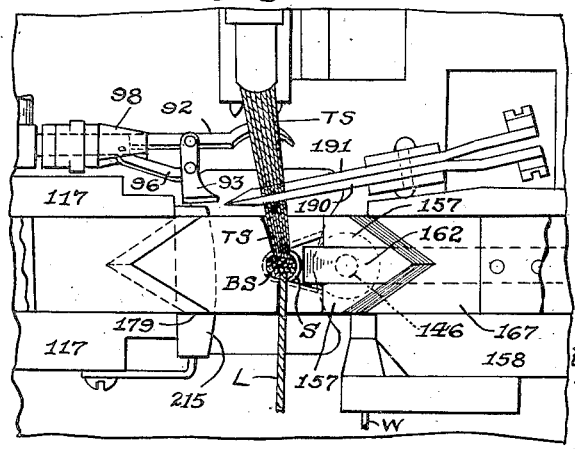
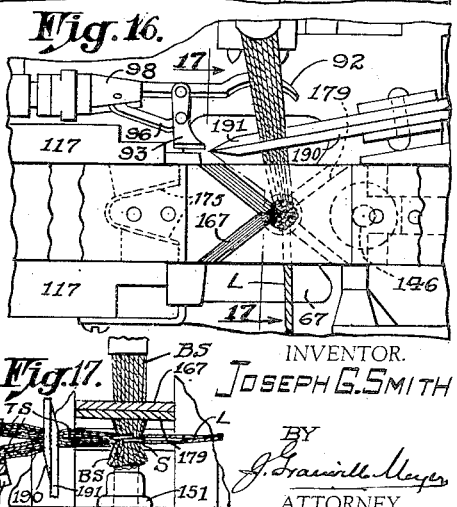

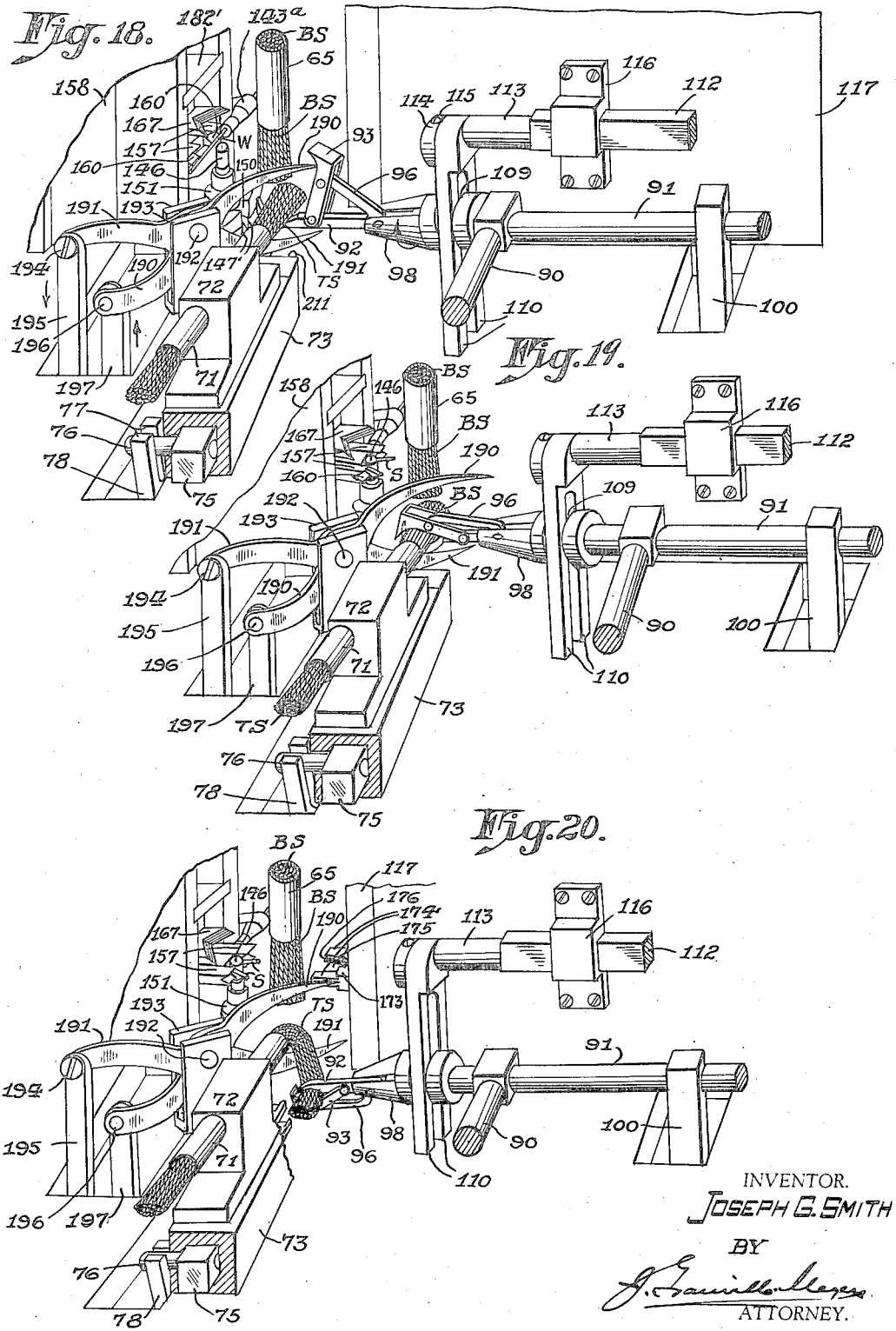

March 10, 1936.  J. G. SMITH  2,033,655
METHOD OF AND APPARATUS FOR MAKING BALL TASSELS
Filed Sept. 29, 1934  7 Sheets-Sheet 7
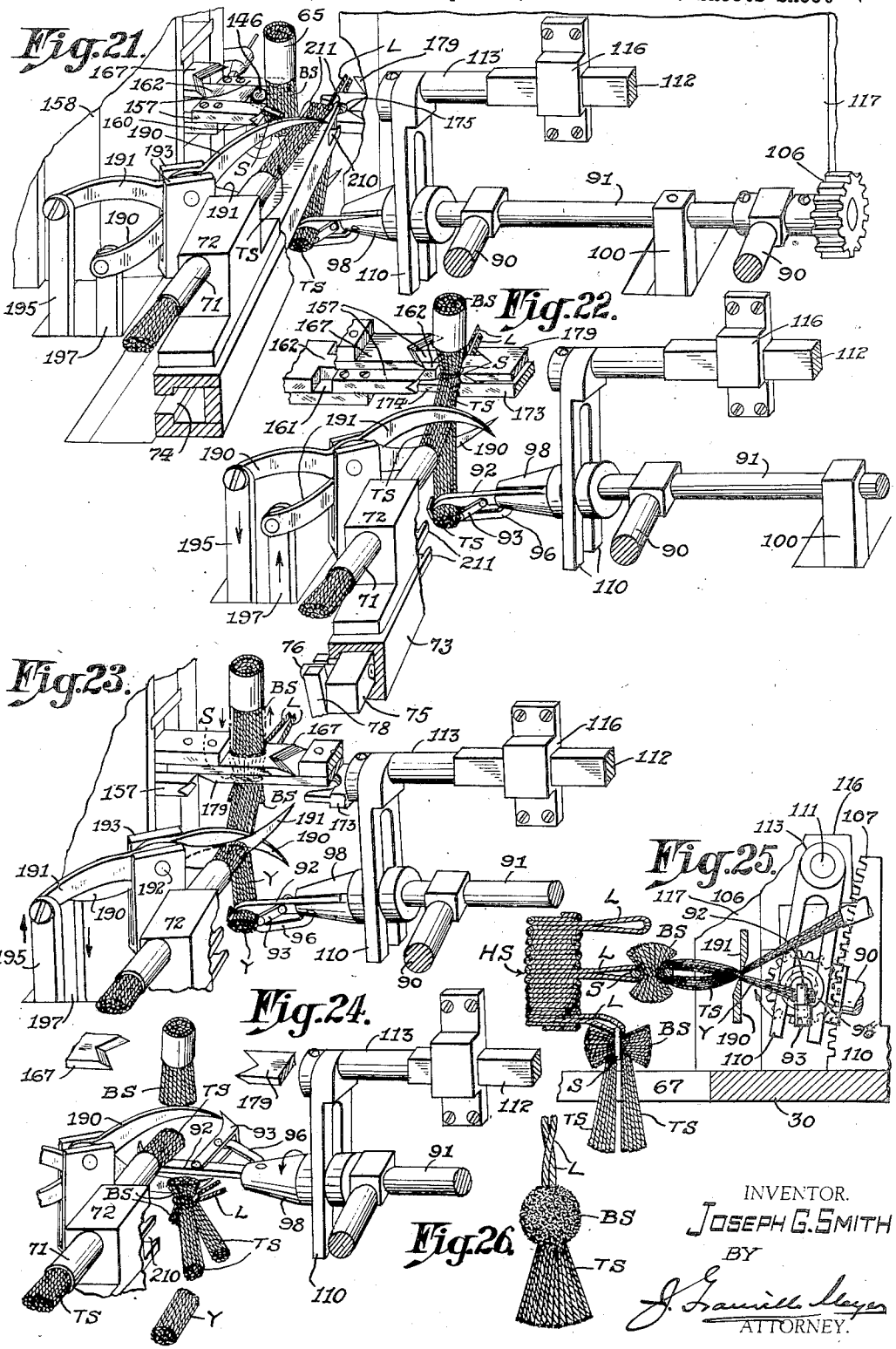
INVENTOR.
JOSEPH G. SMITH
BY
J. Granville Meyer
ATTORNEY.

Patented Mar. 10, 1936

2,033,655

UNITED STATES PATENT OFFICE 2,033,655

METHOD OF AND APPARATUS FOR MAKING BALL-TASSELS

Joseph G. Smith, West Norwood, N. J., assignor to Consolidated Trimming Corporation, New York, N. Y., a corporation of New York Application September 29, 1934, Serial No. 746,240

20 Claims. (Cl. 28—2)

My present invention relates to a novel method of and machine for making fringe elements such as "balls" and "ball tassels" composed of strand material, and more particularly to a method of and machine for making the so-called "ball-tassels" disclosed in my copending application, Serial No. 739,478, filed August 11, 1934.

It is very old in the art to provide mechanism for forming decorative fringe "balls" composed of strand material and wherein a short section of the strand material is cut from a group of strands taken from a common supply source, the strands of the cut section being held together by a wire staple wrapped around the section intermediate its ends; but so far as I am aware it is broadly new with me to combine a second group of tassel strands with the ball strands to form what I have termed a "ball-tassel" which is made up entirely of sections or short lengths of two groups of strand material bound together by a common binding element, such as a wire staple.

According to the present invention I advance two groups of strands which are in rope-like formation, one to form the balls and the other to form the tassels. The two separate groups are positioned adjacent each other and a binding element, such as a wire staple, is wrapped around the two strand groups at a point intermediate the ends of a predetermined section or length thereof and the sections or lengths are then cut transversely to sever them each from its supply and with the strands of one section, as, for instance, the tassel section, of greater length than the ball section. The two sections thus bound together are finished in the usual way so that the strands of the tassel will hang loosely from those of the ball section to provide an attractively formed and symmetrical "ball-tassel" which may be suspended from a fringe "header", as by means of a header loop to which the ball-tassel is preferably attached at the time it is formed; the ball, tassel and loop all being held together as a complete unit by means of a single binding element.

In the embodiment of the invention as herein illustrated and described, I provide for advancing the group of tassel strands in a path at substantially right angles to the path of movement of the ball strands, and then folding the group of tassel strands so that all the folded strands of the group will assume a substantially U-formation. The thus folded group of tassel strands is positioned lengthwise of and adjacent an end of a group of the ball strands and while in this condition the two groups of strands are tightly bound together by an encircling binding element such as a wire-staple. Sections of the thus connected strand groups are then cut transversely to sever them each from its respective supply source, so that when the elements are finished in the usual way, ball strands will assume a spherical or ball formation, while the folded strands will hang or depend loosely from the ball in tassel formation.

The strand material employed may be of any suitable character, such as silk, cotton, rayon, worsted or mixtures thereof, or it may consist of small strands of flexible paper, metal, cellulose, or other appropriate composition material.

The machine of the present invention is entirely automatic and is adapted to make ball, ball-tassel and tassel elements complete to be separately employed where needed, and is also adapted to attach the elements as formed, one to each of a number of loops carried by a conventional header-strip of fabric or other material.

The machine as herein illustrated embodies mechanism for advancing two separate rope-like groups of strands, means for folding one of the groups back upon itself, means for binding together the strands of the two groups at a point intermediate their ends, means for then severing a section of predetermined length from each rope-like group to provide a fringe element composed of assembled ball strands and tassel strands bound together by a common binding element.

Figs. 11–16 inclusive, are detail plan views showing several steps in the assembling of the respective strands and their binding element;

Figs. 17 is a view taken on the line 17—17 of Fig. 16;

Figs. 18–24 inclusive, are perspective views showing the several steps in the assembling of the respective strands and binding element;

Fig. 25 is a view in side elevation illustrating the attachment of the ball tassels to loops of a header strip; and Fig. 26 is a view showing one of the ball tassels formed in accordance with the present invention and similar to the ball tassel forming the subject matter of my copending application, Serial No. 739,478, filed August 11th, 1934.

Figure 1:
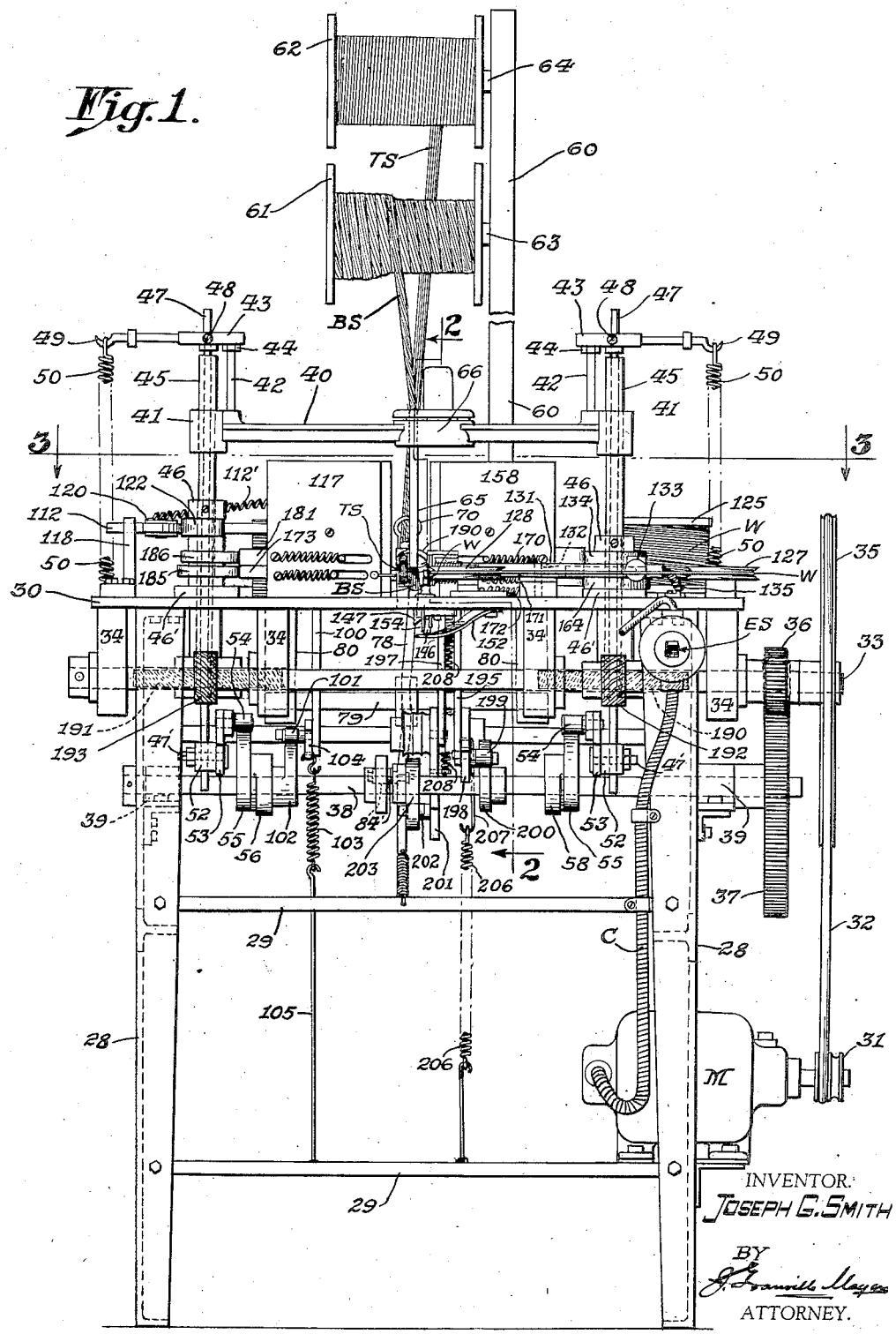
Fig. 1 is a front elevation of a machine embodying the present invention.
Figure 2:
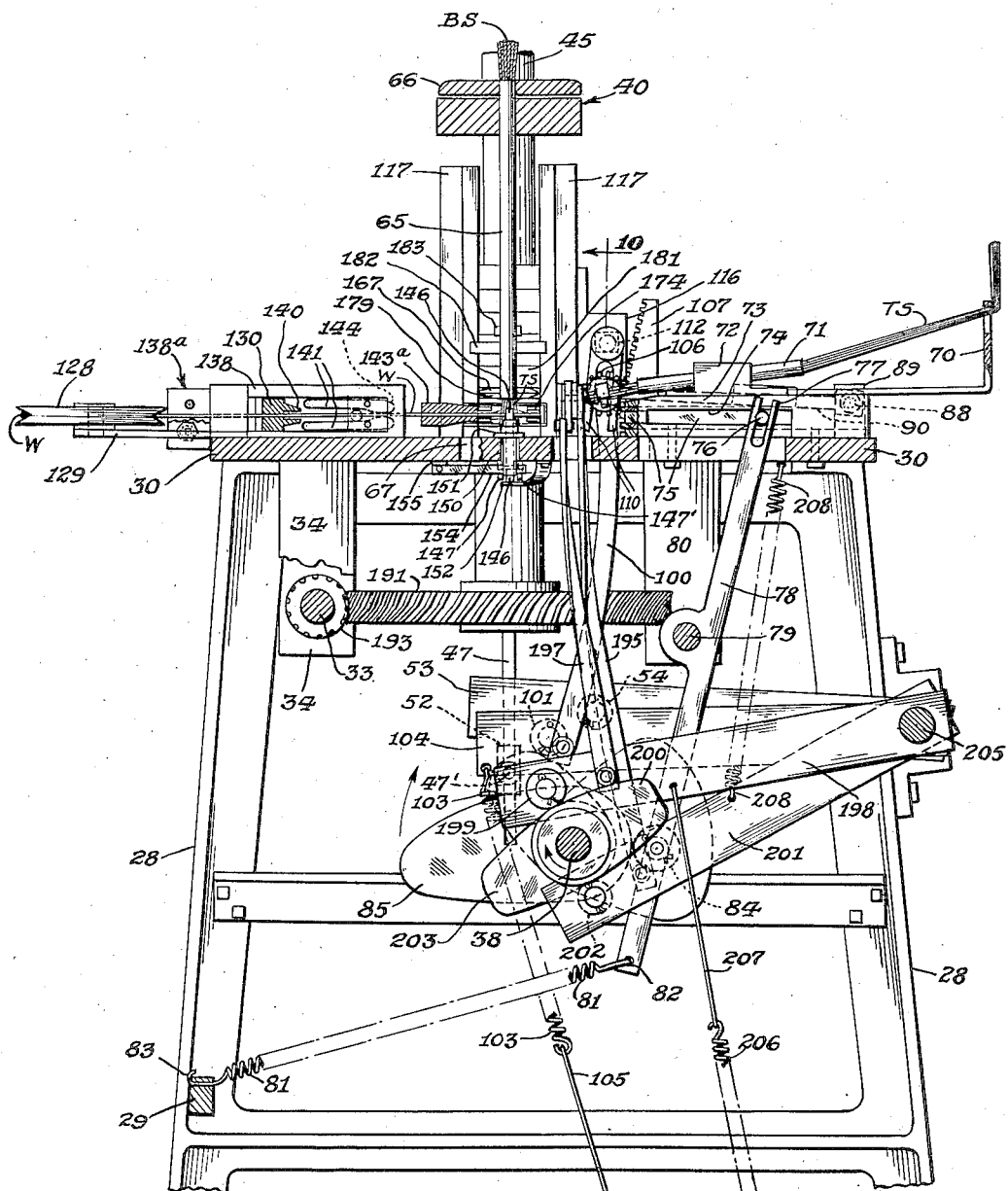
Fig. 2 is an enlarged view taken on the line 2—2 of Fig. 1.
Figure 3:
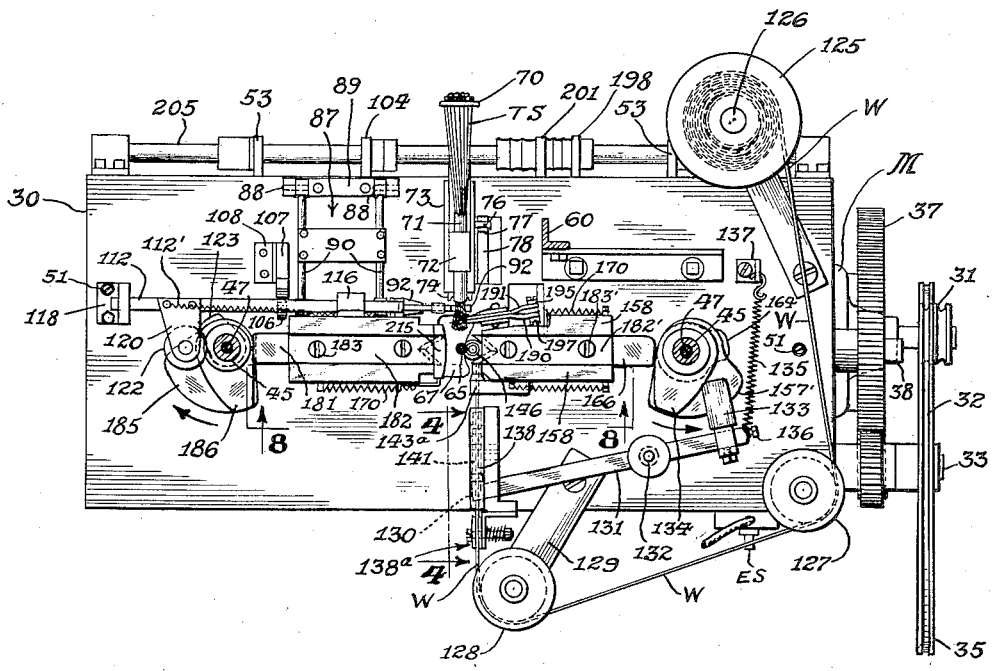
Fig. 3 is a view taken on the line 3—3 of Fig. 1.

Referring for the present to Figs. 1–3, the numeral 28 designates generally the frame or standards forming the base of the machine, joined by cross pieces 29, and which support on their tops a bed plate 30. The lower cross piece 29 may support an electric motor M, the shaft of which is keyed to a pulley 31 around which is trained a belt 32. A main driving shaft 33 is journaled through bearings 34 beneath the top or bed plate 30 and has keyed thereto a pulley 35, around which the belt 32 is also trained. A relatively small gear 36 is keyed to the shaft 33 and meshes with a larger gear 37 keyed to a shaft 38 journaled through bearings 39 supported by the frame 28. The operation of the motor and driving shafts 33, 38 and parts associated therewith, may be controlled by an electric switch ES conveniently located on the frame 28 and connected by cable C with the motor.

Above the bed plate 30 is a cross head 40 having at each end a hub 41, and an upstanding rod 42. Each of the rods 42 is coupled to a plate 43 by means of a lock nut 44 and a screw threaded end on the rods engaging into the plates 43. The hubs 41 are slidably mounted on tubular shafts 45, which are mounted through bearings 46' secured to the bed plate 30. Collars 46 are keyed to shafts 45 to maintain forming cams, hereinafter described, in proper operating position. The plates 43 are provided with openings through which extend rods 47 also extending through the shafts 45 and through the bed plate 30, and the plates 43 are keyed to the rods 47 as by means of set screws 48. The outer ends of the plates 43 are provided with hooks 49 which receive the upper ends of coiled springs 50 anchored at their other ends to the bed plate 30, as shown more clearly in Fig. 9 where the lower ends of the springs are held to the bed plate by screws 51. The lower ends of the rods 47 are secured at 47' to blocks 52 which in turn are connected to links 53 having on their forward ends rollers 54. Cams 55 are carried by discs 56 keyed to the shaft 38 so that at predetermined intervals during the rotation of the shaft 38 the links 53 under the action of the cams and rollers 54 will raise and lower the blocks 52 and consequently the rods 47 so that the cross-head will be raised and lowered. The provision of the springs 50 is not absolutely necessary, but is found to be advantageous in stabilizing the action of the cross head.

A standard 60 extends above the bed plate 30 and rotatably supports bobbins 61, 62, respectively, on the shafts 63 and 64. The bobbin 61 is shown containing strands BS, which are disposed through a tube 65 affixed in the central portion 66 of the cross-head. The lower end of the tube 65 is in alinement with an opening 67 in the bed plate 30, and also in alinement with the assembling mechanism hereinafter described.

As will be explained in detail hereinafter, the reciprocating or up-and-down movements of the cross-head 40 moves the tube 65 up and down relatively to the assembling mechanism to effect feeding movement of the strands BS, which in the present instance, are the strands which form the ball portion of the ball tassels.

The bobbin 62 contains the strands TS which are utilized to form the tassel portion of the ball and tassel, and these strands are led down from the bobbin at the rear of the bed-plate and through a loop in the guide 70 and then forwardly through a tube 71 supported by a block 72.

The block 72 and guide 70 are fixedly mounted on top of a guide plate 73 provided with a longitudinal groove 74 within which is slidably mounted a yarn advancing and folding member 75. The member 75 is provided on one side with a pin 76 extending through a slot in one side of the guide plate 73 and which is disposed in the forked end 77 of a lever 78, which is pivoted intermediate its ends on the shaft 79 supported by fixed brackets 80 depending from the bed-plate 30. A coiled spring 81 has one end mounted through an opening 82 in the lower end of the lever 78 and its other end anchored to one of the cross pieces 29 as indicated at 83. Between the pivot 79 and the coiled spring 81 on the lever 78 is a roller 84, disposed in the path of movement of a cam 85 keyed to the shaft 38. Obviously, rotation of the cam effects oscillation of the lever 78 and reciprocating movement of the member 75 to cooperate with a gripper for the yarns TS to effect feeding and folding of the yarn, as presently described.

Figure 9:
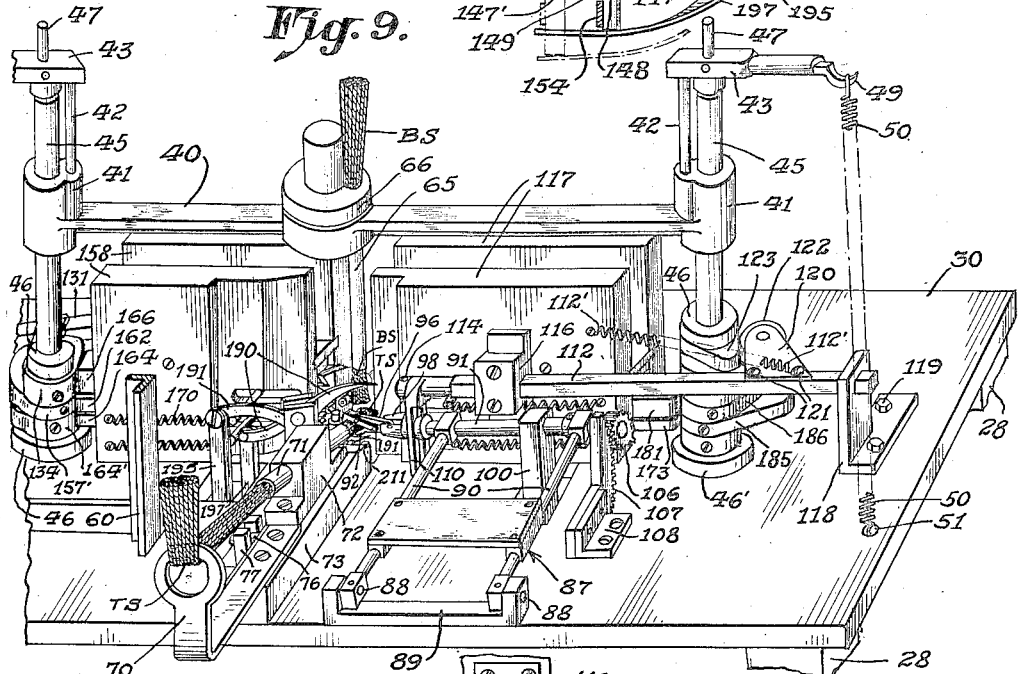
Fig. 9 is a perspective view looking from the rear of the apparatus and showing parts above the bed-plate.
Figure 10:
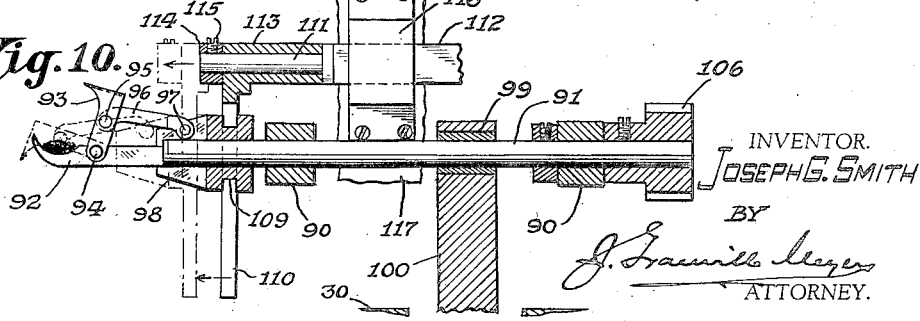
Fig. 10 is an enlarged detail view partly in section of the tassel strand gripper mechanism looking in the direction of the arrow 10 of Fig. 2.

The gripper mechanism for the yarn TS and which cooperates with the pusher 75 is shown best in Figs. 3, 9, and 10, wherein a frame or rocker carriage designated generally by the numeral 87, has its side bars or arms 90 pivotally connected at 88 to a bracket 89 on the rear of the bed-plate. The forward ends of the arms 90 receive a shaft 91, one end of which has formed thereon or rigidly connected thereto a jaw 92. A second jaw 93 is pivotally connected at 94 to the jaw 92 and also pivotally connected at 95 to a link 96, the other end of which is pivotally connected at 97 to a collar 98 slidably mounted on the shaft 91. The shaft 91 is journaled through bearing 99 carried by a lever 100, which extends down through the bed-plate and is provided at its other end (see Fig. 1) with a roller 101 disposed in the path of movement of a cam 102 on the shaft 38. A coil spring 103 is connected by a hook to a link 104 and by an elongated hook 105 to one of the cross pieces 29 to normally hold the link down, and to normally hold the roller 101 in proper position for engagement by the cam 102.

The other end of the shaft 91 has keyed thereto a pinion 106, the teeth of which mesh with a fixed rack 107 secured by a bracket 108 on top of the bed-plate.

The collar 98 is provided with a groove 109, which receives the fork 110 journaled on the rounded end 111 of a square shaft 112. The upper end or hub of the fork designated by the numeral 113 is held on the end 111 of the shaft 112 by means of collar 114 and set screw 115. The shaft 112 is slidably supported through bracket 116 fixedly secured to one of a pair of upstanding plates, 117, forming the sides of the housing for one of the cutters and female die, presently described, and through a bracket 118 fixed to the bed-plate as by bolts 119. The bracket 120 is secured to the top of the shaft 112 as by screws 121, and carries a roller 122 disposed in the path of movement of a cam 123 on one of the shafts 45, for rotation in synchronism with the other forming mechanism presently described. A coil spring 112' is secured to the shaft 112 and plate 117 to normally urge the shaft to the left as viewed in Fig. 9.

Obviously, rotation of the cam 123 reciprocates the shaft 112 whereby the fork 110 will move the collar 98 back and forth on the shaft 91, so that the link 96 will open and close jaw 93 relative to the jaw 92. The jaws 92, 93, are in open position when the shaft 91 is elevated by the lever 100, such position being shown in Fig. 10. At this time the strands TS are on the jaw 92 and the cam 123 acts on roller 122 to cause the jaws to be closed to grip the strands therebetween after which the lever 100 lowers the shaft 91 whereupon the pinion 106 causes the shaft 91 and the jaws to rotate to turn the jaws and the strands gripped therebetween, as hereinafter explained more fully in detail. For the present I will mention that as the jaws with the strands TS gripped therebetween are turned and lowered, the member 95 moves against the strands to fold them partially upon themselves. This movement also effects feeding of the strands TS through the tube 71. It is also at this time, namely, when the strands TS are folded, that the assembling thereof with the strands BS is accomplished to form the ball tassel.

Figure 4:
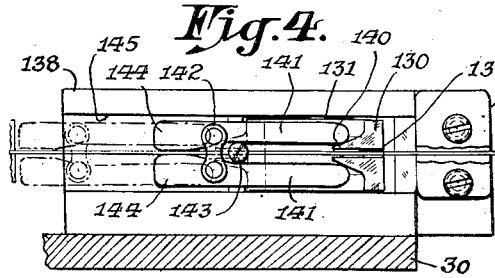
Fig. 4 is an enlarged view of part of the wire feeding mechanism looking in the direction of the arrows on the line 4—4 of Fig. 3.

As previously mentioned the strands BS and TS are bound together by a common binding element preferably in the nature of a wire staple, and I provide means for forming the wire staples, at or about the time of wrapping them about the strands, from a continuous strand of wire. Referring particularly to Figs. 3 and 4, the numeral 125 designates a spool containing the wire W, the spool being mounted on a spindle 126. The wire is fed across the bed plate 30 around a pulley 127 and then around another pulley 128 secured on a bracket 129 forwardly of the bed plate. From the pulley 128 the wire is fed through the cutting mechanism to the assembling mechanism.

The wire feeding mechanism is shown, Figs. 3 and 4, as containing a head designated generally by the numeral 130, and carried on a lever 131 pivoted at 132 on the bed plate. The other end of the lever 131 carries an abutment 133 disposed in the path of movement of a cam 134 on one of the shafts 45. A coiled spring 136 is connected at one end to the lever 131 as by means of a screw 136, and is anchored at its other end to a fixed bracket 137 on the bed plate. The lever 131 moves within a slotted guide 138, and the head 130 is provided with a central bore or aperture 139 through which the wire is fed. The wire before passing through the head 130 passes between the plates of a frictional gripper, designated generally by the numeral 138a, which is attached to the guide 138. The coil spring forming part of the gripper or clutch 138a and shown in Fig. 3, urges the plates forming parts of the clutch lightly together to grip the wire. The head 130 has a tapered end 140 disposed between a pair of grippers 141 pivotally connected by a link 142. Between the grippers is an additional wire guide in the nature of a screw 143 through which the wire is led. The rear ends 144 of the grippers 141 are enlarged so that their confronting ends are normally spaced apart a relatively short distance slightly greater than the diameter of the wire. The grippers and the head 130 slide within a channel 145 in the guide 138 which is affixed to the bed plate 30.

After passing through head 130 and between grippers 141, the wire passes through a fixed guide 143a secured to the housing for the wire cutter, and the inner end of guide 143a is substantially in alinement with one of the cutting edges to brace the wire as it is being cut.

As the cam rotates it engages the abutment 133 at predetermined intervals, moving the lever 131 on its pivot 132 to cause the tapered end 140 of the head 130 to be forced between the grippers 141, bringing the enlarged ends 144 into gripping relation with the wire, and at the same time moving the grippers rearwardly to feed the wire a predetermined distance to the cutting and forming mechanism. The spring 135 returns the lever to its normal position permitting the enlarged ends 144 to separate as they return, and due to the fact that the wire is gripped by the gripper or clutch 138a the uncut portion thereof is returned with the head 130 and other parts of the feeding mechanism.

Figure 8:
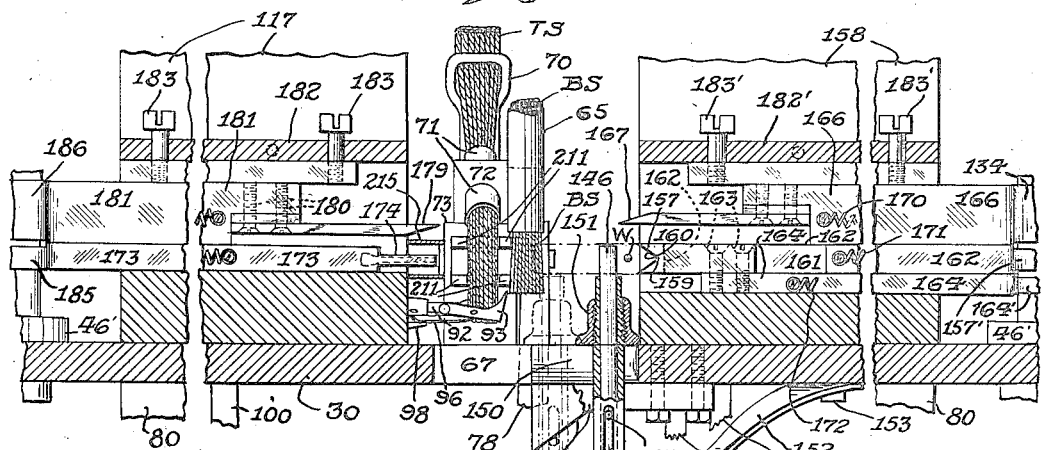
Fig. 8 is an enlarged view taken on the line 8—8 of Fig. 3.

As the wire W is moved by its feeding mechanism, a predetermined length thereof sufficient to form a binding staple is positioned across the side of a pin 146, which is provided adjacent its lower end with a lug 147 disposed in a slot 148 in a sleeve 149 extending through a slot 150 in the bed plate 30 adjacent the opening 67 as shown clearly in Fig. 8. The lug 147 engages a fixed cam 147', and the sleeve 149 is screw threaded at its upper end into a nipple 151, the base of which is wider than the slot 150. A leaf spring 152 is secured as by a screw or bolt 153 to the bottom of the base plate and engages the lower end of the pin 146 to normally hold the same in elevated position. A second spring 154, of appreciable strength, is secured to a bracket 155 (as shown in Fig. 2) on the base of the bed plate and bears against the side of the pin 146 adjacent its lower end. The pin 146 may be termed a staple former or anvil, because it is around this that the lengths of wire which are cut from the strand W are bent to form the staples which bind the strands of the ball tassel together.

As shown best in Figs. 8 and 11–14, the mechanism for cutting and bending the wire comprises spaced plates 157 slidably mounted between upright plates 158, corresponding to plates 117 and forming the sides of the housing for the wire cutting mechanism and male die. The forward ends of the plates 157 are provided with knife edges 159, between which is a groove indicated by the numeral 160 in Fig. 8. The fixed wire guide 143a is adjacent the front cutting edge to brace the wire as it is being cut.

Within the space 161 between the plates 157, is a male forming die 162 connected by screws 163 to a plate 164 slidably mounted on top of a plate 165 on the bed plate. Above the plate 157 is another plate 166 carrying at its forward end a knife blade or ball strand cutter 167 connected to the plate 166 by screws 168. The plate 166 has attached thereto a coiled spring 170, while the plate 157 has a similar spring 171 and the plate 164 a similar spring 172, all anchored to fixed parts on the plate 158 to normally hold the cutters and formers in retracted position.

Figure 5:
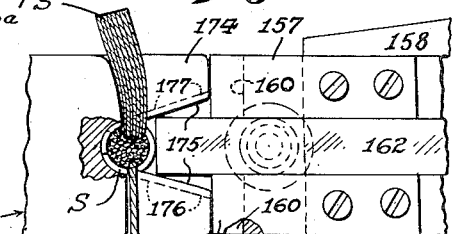
Fig. 5 is an enlarged fragmentary plan view of the forming dies shown assembling the ball and tassel strands with their binding element.
Figure 7:
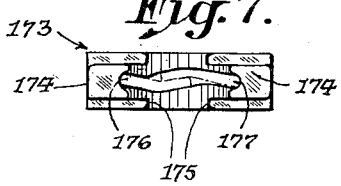
Fig. 7 is an end view of the female die.
Figure 6:
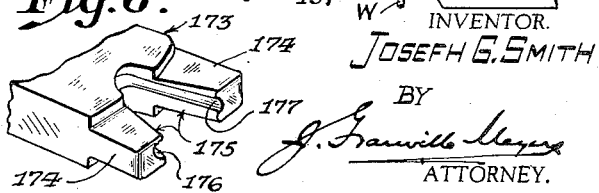
Fig. 6 is a perspective view of the forming end of the female die of the ball and tassel assembling mechanism.

On the opposite side of the opening 67 and in alinement with the cutter 157 and male die 162 is a female die plate 173 housed between the plates 117. Referring for the moment to Figs. 5 and 6, it will be noted that the female die is provided with two blunt noses 174 providing therebetween a notch 175 to receive the respective groups of strands, staple S and male die 162. The inner face of the notch 175 is provided with grooves, 176, 177, which are inclined and merge into each other at the center of the notch, but at their outer ends the grooves are in alinement with each other for a purpose presently described. Above the plate 173 is a cutter blade 179 to cooperate with a cutter blade 167 and attached by screws 180 to a plate 181, also slidably mounted within the housing provided by the plates 117 and the top cover 182 held therebetween by screws 183, corresponding to the cover 182' held between the plates 158 by screws 183'.

The ends of the plates 173 and 181 are each alined with cams 185, 186, respectively, on the other of the shafts 45.

Referring for the moment to Fig. 1, it will be noted that the shaft 45 at the right hand side of the machine is keyed to a gear wheel 199, while the other shaft at the left hand side of the machine is keyed to a similar gear wheel 191. The threads on the respective gear wheels 190, 191, are right and left handed, and the gear wheel 190 meshes with a pinion 192 while the gear 191 meshes with a pinion 193. The pinions 192, 193, are keyed to the shaft 33 and driven thereby so that as the pinions rotate they will rotate the gears 190 and 191 and shafts 45 in opposite directions, that is, one clockwise and the other contra-clockwise, so that the cams 134, 157', and 164' will force the plates 166, 157, and 164, respectively, towards the plates 173 and 181, while the cams 186 and 185 will force the plates 181 and 173 in the opposite direction, respectively. The relative movements of the cams and cutters and forming dies is such as to synchronize their movements relative to each other and to other parts of the forming and assembling mechanism, to accomplish the steps in forming the ball tassel, as hereinafter explained.

At the time, or just after, the tassel strands TS have been folded and bound by the staple, they are severed by a scissor-like cutter shown best in Figs. 18–24 and comprising an upper blade 190 and a lower blade 191 pivotally mounted on a shaft 192 through a bracket 193 on the bed plate. The rear end of the blade 190 is connected as by a screw 194 to a lever 195 while the lower blade 191 is similarly connected at 196 to a lever 197. Both the levers 195 and 197 extend through and below the bed plate, and the lever 195 is connected to a link 198 carrying a roller 199 disposed in the path of movement of a cam 200 keyed on the shaft 38. The lever 197 is connected to a link 201 carrying a roller 202 disposed in the path of movement of a cam 203 also keyed on the shaft 38. The roller 199 is disposed above the cam while the roller 202 is disposed beneath the cam 203, so that as the cams rotate with the shaft 38 the levers 195 and 197 will be reciprocated in opposite directions to effect closing and opening movements of the blades 190 and 191 to sever the strands TS.

All of the links 53, 104, 198, and 201 are pivotally mounted on a shaft 205 as shown in Figs. 2 and 3. The link 198 is normally held down by coiled spring 206 anchored between one of the cross bars 29 and a hook 207 connected with the link, while the link 201 is normally held up by a coiled spring 208 anchored to the bed plate and secured at its other end to the link itself.

With the foregoing in mind the operation of the mechanism in performing the steps in the method of forming the ball tassels is as follows: With the parts in the position shown in Figs. 11 and 18, that is, with the tassel strands TS projecting over the lower jaw 92 of the gripper, and with the ball strands BS extending down near the pin or anvil 146, the shaft 112 is moved by the cam 123 and roller 122 of Fig. 9 to cause the fork 110 to shift the collar 98 closing the jaw 93 relative to the jaw 92 to clamp the strands TS therebetween. The shaft 91 is then rotated by downward movement of the lever 100 which causes the pinion 106 to ride on the rack 107 so that the jaws 92 and 93 are partially rotated turning the strands TS down and rearward, and at the same time the pusher or strand folder 75 is moved forwardly to engage the strands intermediate the end of the tube 71 and the jaws 92 and 93, whereby they are folded upon themselves as shown in Fig. 21. The cross head 40 is also lowered placing the strands BS alongside pin 146. At this time I would call attention to the fact that the pusher 75 has its strand engaging end notched as at 210 (Fig. 21) and also provided with prongs 211 on opposite sides of the notch between which the strands TS are received. This is to permit one of the blunt noses of the female die 174 to pass through the notch 210 so that the strands TS are located between the noses and in the notch 175, as shown in Figs. 14 and 21.

Referring now to Figs. 11 and 18, it will be noted that the wire is located across the ends 159 of the wire cutter 157 and also across the pin or anvil 146. As the cam 157' is rotated it forces the wire cutter 157 in to cut the wire and to bend the length cut into a staple S, as shown in Fig. 12, around the pin or anvil 146. This cutting and bending pressure is comparatively light and not sufficient to cause lateral movement of the pin 146 against the action of its retaining spring 154. After the wire is cut and bent as shown in Fig. 12, the strands TS have been folded and engaged over one of the noses of the female die 174, in the notch 175, in alinement with which the lower ends of the strands BS are also located, see Fig. 14. After the wire has been cut and bent to form the staple S and after the strands TS and BS have been located in the notch 175, the male die 162 is moved by the cam 157' into engagement with the staple, as shown in Fig. 14, and under considerable pressure so that the pin 146 is forced down by the action of the lug 147 on the fixed cam surface 147' permitting the male die to force the staple into the grooves 176—177 of the female die, and to bend the staple around the groups of strands BS and TS in the notch 175 shown in Fig. 15. At this time the scissor blades 190, 191, are closed upon the strands TS severing them between the tube 170 and the gripper jaws 92 and 93, (Figs. 16 and 17) so that the ends of the severed group of strands TS which form the tassel are even. In other words, two layers of the strands TS are simultaneously severed. As this is taking place the blades 167 and 179 cross each other under the action of the cams 134 and 186 to sever the strands BS, (Fig. 16).

Figs. 18–24 clearly show the several steps above described with the parts in perspective. In Fig. 18 the jaws 92 and 93 are open with the strands TS over jaw 92, and the shaft 91 elevated. In Fig. 19 the jaws have closed on the strands TS, and in Fig. 20 the shaft 91 has been lowered turning the jaws and bending the strand ends downwardly and rearwardly, while the staple S has been cut and formed. The next step is shown in Fig. 21 where the strands TS have been engaged by the folder or pusher 75 and the female die has engaged the fold in said strands while strands BS have been lowered. In Fig. 22 the dies have bent the staple around the respective group of strands and the pin 146 has been forced down by the male die. Figs. 23 and 24 show the severing of the strands, during which time the cross head 40 has moved up while the strands BS are still gripped, and jaws 92 and 93 are returning to normal position, the letter Y indicating the end of the severed portion of strands TS.

While it is not absolutely essential to the practice of the invention in forming ball tassels as hereinabove explained, I prefer to provide adjustable means for moving the shear blades 190 and 191 relative to the gripper jaws and the forming dies to provide for different lengths of tassels. In Fig. 11, I have shown the brackets 193 on which the shear blades are pivoted, having their bases mounted through the slot 193' in the bed plate and adjustably held in desired position by a screw 194'. Obviously, by unloosening the screw the bracket may be moved forwardly or rearwardly relative to the forming dies and gripper jaws to desired positions and thus varying the lengths of the tassel strands which are severed from the source of supply. Of course the screw is tightened to firmly hold the shears in any established position.

Another preferred detail resides in the provision of means for assuring the formed ball-tassels being removed from the female die, as it may sometime happen that the binding wire and ball tassel may stick in the die. To this end, as shown in Figs. 8 and 11, the die 174 slides between a pair of plates or a tubular structure 215. Obviously in the event the ball-tassels stick or cling to the die, the strands will engage the plates 215 as the die is retracted, so that the ball tassel will be knocked loose and prevent jamming of the machine.

The ball tassels so formed may drop through the opening 67, or may be applied to loops L of a header strip HS, as shown in Fig. 25. This latter method may be accomplished by positioning one of the loops L in the notch of the female die each time a ball tassel is made so that the staple will also encircle the loops and attach the ball tassels thereto.

What I claim is:

1. Apparatus for making ball-tassels comprising, means to position separate groups of strands of yarn or the like adjacent each other, one group of strands being relatively short to form ball strands and the other group being of greater length to form tassel strands, and means to apply a common binding element around said groups compressing said groups intermediate their ends whereby the strands of the shorter group are fluffed out at their ends to form a ball and the strands of the longer group are folded upon themselves around said element within the ball and depend therefrom to form a tassel, each group of strands being encircled by the binding element at only one point in the length thereof.

2. Apparatus for making ball-tassels comprising, means to position a pair of groups of strands adjacent each other with one group folded and disposed at an angle relative to the other, one group of strands being relatively short in length to form ball strands and the other group being of greater length to form tassel strands, and means to apply a common binding element around the strands of the longer group to form a fold intermediate the ends thereof and simultaneously around the strands of the shorter group and compressing said groups whereby the strands of said shorter are fluffed out at their ends to form a ball and the strands of said longer group are folded upon themselves around said element within the ball and depend therefrom to form a tassel, each group of strands being encircled by the binding element at only one point in the length thereof.

3. In a machine for forming ball-tassels and including a notched die to receive a group of ball strands, and means to encircle said strands with a binding element, the combination of means to feed a group of tassel strands to said notched die to be encircled by said element simultaneously with said ball strands.

4. In apparatus for forming ball-tassels and including a notched die to receive a group of ball strands, and means to encircle said strands with a binding element, the combination of means to feed a group of tassel strands in folded position and at substantially right angles to said ball-strands to said notched die to be encircled by said element simultaneously with said ball strands.

5. In apparatus for forming ball-tassels and including a notched die to receive a group of ball strands, and means to encircle said strands with a binding element, the combination of means to feed a group of tassel strands in folded position and at substantially right angles to said ball-strands to said notched die to be encircled by said element simultaneously with said ball strands, and means to evenly cut the ends of said folded tassel strands.

6. In a machine for forming ball-tassels of the character described, cooperating forming dies to bend a wire around separate groups of ball strands and tassel strands, means to feed the groups of strands to the forming dies, and means to fold the tassel strands transversely to the ball strands prior to the application of the wire.

7. In a machine of the character described including a forming die having a notched end, means to position a group of strands in said notch in substantially straight position, means adjacent said die to grip the end of a second group of strands, means to engage said second group above said gripped end and to advance them in folded condition toward the first group and to position the fold in alinement with said notch, and means to bend a wire simultaneously around said groups.

8. In a machine of the character described including a forming die having a notched end, means to position a group of strands in said notch in substantially straight position, means adjacent said die to grip the end of a second group of strands, means to engage said second group above said gripped end to advance them in folded condition toward the first group and to position the fold in alinement with said notch, means to bend a wire simultaneously around said groups, and means to sever said folded strands.

9. The method of forming ball-tassels of yarn or similar material which comprises positioning two separate groups of rope-like strands adjacent each other, wrapping a binding element tightly about the separate groups intermediate their ends with one group folded upon itself to form the tassel and the other group compressed by the binding element, and then fluffing the strands whereby the said other group forms a fluffy ball concealing the fold in the tassel group.

10. The method of forming ball-tassels of yarn or similar material which comprises folding a predetermined length of one group of strands upon itself, bringing the fold of said group adjacent a second and substantially straight group, and encircling said groups with a binding element engaged over the fold of said first group, and compressing said groups with said element.

11. The method of forming ball tassels from two groups of strands of yarn or the like, each of considerable length, which comprises feeding predetermined lengths of the respective groups into juxtaposition, folding one of said lengths upon itself, passing a binding element through the fold and around the other group to simultaneously encircle both groups, compressing both groups with the binding element where encircled thereby, and severing said predetermined lengths from the remainders of their respective groups.

12. In a machine for making ball tassels including a pair of cooperating dies between which groups of ball strands and tassel strands are bound together by a binding element, means to feed a predetermined length of ball strands between said dies from a source of supply, means to feed a predetermined length of tassel strands in folded condition between said dies from another source of supply, and means to move said dies together to engage said first group and the fold in said second group and to bend the binding element therearound.

13. In a machine for making ball tassels from separate groups of ball strands and tassel strands, and including a die provided with a notch to receive the said groups, and means to bind said groups together with a common binding wire, a reciprocating member to feed a predetermined length of the ball strands into alinement with the notch in said die, a gripper to clamp the end of the group of tassel strands, means to move the gripper to cause it to bend the gripped strands, and a folder to engage the bent portion of the tassel strands and to fold them partially upon themselves with the fold alined with the notch in said die.

14. In a machine for making ball-tassels from separate groups of ball strands and tassel strand, and including a die provided with a notch to receive the said groups, means to bind said groups together with a common binding wire, a reciprocating member to feed a predetermined length of the ball strands into alinement with the notch in said die in substantially straight condition, means to feed the tassel strands toward the notched die transversely to the path of movement of the ball strands, said tassel strand feeding mechanism including a gripper to grasp the tassel strands, means to raise and lower the gripper to partly fold the tassel strands, and a pusher engageable with the partly folded portion of the tassel strands to further fold the tassel strands and advance the fold in alinement with the notch in the die, and means to move the die into engagement with the fold in the tassel strands.

15. In a machine for making ball-tassels from separate groups of ball strands and tassel strands, and including a die provided with a notch to receive the said groups, a reciprocating member to feed a predetermined length of the ball strands into alinement with the notch in said die, a gripper to clamp the end of the group of tassel strands, means to move the gripper to cause it to bend the gripped strands at an angle to their original gripped position, a folder to engage the bent portion of the tassel strands and to fold them partially upon themselves with the fold alined with the notch in said die, means to move the die to cause the respective groups of strands to be engaged in the notch, and means to encircle said groups with a common binding wire.

16. In a machine for making ball-tassels from separate groups of ball strands and tassel strands, and including a die provided with a notch to receive the said groups, a reciprocating member to feed a predetermined length of the ball strands into alinement with the notch in said die, a gripper to clamp the end of the group of tassel strands, means to move the gripper to cause it to bend the gripped strands at an angle to their original gripped position, a folder to engage the bent portion of the tassel strands and to fold them partially upon themselves with the fold alined with the notch in said die, means to move the die to cause the respective groups of strands to be engaged in the notch, means to encircle said groups with a common binding wire, and means to sever the clamped groups from their respective sources of supply.

17. The structure of claim 3, wherein the means to feed the groups of tassel strands to said notched die comprises a guide for the strands, a gripper to grasp the ends of the strands, means to rotate said gripper, means to move said gripper across the side of the die to bend the strands, and a pusher located in the horizontal plane of the die and movable across the strands after the gripper has been moved across the side of the die to fold the strands upon themselves and to locate the fold in alinement with the notch of the die.

18. In a machine of the character described including a forming die having a notched end, means to position a group of strands in said notch in substantially straight position, means adjacent said die to grip the end of a second group of strands, means to engage said second group above said gripped end to advance them in folded condition toward the first group and to position the fold in alinement with said notch, means to bend a wire simultaneously around said groups, means to sever said folded strands, and means for adjusting said severing means relative to said die to regulate the length of the second group or tassel strands.

19. In a machine for making ball tassels including a pair of cooperating dies between which groups of ball strands and tassel strands are bound together by a binding element, means to feed a predetermined length of ball strands between said dies from a source of supply, means to feed a predetermined length of tassel strands in folded condition between said dies from another source of supply, means to reciprocate said dies to move them together to bend the binding element around said groups of strands and to move them apart after the groups of strands have been bound, and means disposed in the path of movement of one of the dies to remove the ball tassels therefrom after they have been formed.

20. The method of making ball tassel fringe elements from strand material, which consists in advancing two groups of strands, one at an angle to the other, doubling an end portion of one of the groups upon itself and positioning the doubled portion adjacent and at an angle to the strands of the other group, binding the two groups together, and severing a section of unequal length from the respective groups to provide a ball tassel.

JOSEPH G. SMITH.